(12) United States Patent
Dalferth et al.

(10) Patent No.: US 6,220,011 B1
(45) Date of Patent: Apr. 24, 2001

(54) CONNECTING CHAIN LINK

(75) Inventors: Hans Dalferth, Aalen; Zvonimir Bogdan, Abtsgmünd; Hans-Jürgen Scherle, Aalen; Alfred Puppel, Wuppertal, all of (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 09/526,107

(22) Filed: Mar. 15, 2000

(30) Foreign Application Priority Data

Mar. 19, 1999 (DE) ............................................. 199 14 014

(51) Int. Cl.⁷ ..................................................... F16G 15/14
(52) U.S. Cl. ........................................................ 59/85; 59/84
(58) Field of Search ................................... 59/78, 84, 85, 59/86, 87, 88

(56) References Cited

U.S. PATENT DOCUMENTS

| | | | |
|---|---|---|---|
| 859,082 | * 7/1907 | Kenter ........................................ | 59/85 |
| 2,525,724 | * 10/1950 | Robbins ...................................... | 59/85 |
| 2,761,275 | * 9/1956 | Robbins ...................................... | 59/85 |
| 2,819,586 | * 1/1958 | Pierre ......................................... | 59/85 |
| 2,979,886 | * 4/1961 | Robbins ...................................... | 59/85 |
| 4,090,357 | * 5/1978 | Smith ......................................... | 59/85 |
| 4,505,103 | * 3/1985 | Dalferth et al. ............................ | 59/85 |
| 6,021,634 | * 2/2000 | Brodziak .................................... | 59/85 |

FOREIGN PATENT DOCUMENTS 7435053    5/1976 (DE) .
298 11 332 U  11/1998 (DE) .

* cited by examiner

*Primary Examiner*—David Jones
(74) *Attorney, Agent, or Firm*—Mark P. Stone

(57) ABSTRACT

In the case of a connecting chain link for link chains having two connecting-link parts (1, 2) which can be displaced by limited amounts in the longitudinal direction of the connecting link, in order to open and close the connecting link, and which are each provided with a stub (6) at one end (4) and at the other end (5) with a pocket (7) to hold the stub (6), in the closed position the connecting-link parts (1, 2) are locked in place with the aid of a central locking element (10) which rests in shell-shaped supporting surfaces (9) of two projections (8) which protrude into the clear interior of the connecting link.

20 Claims, 4 Drawing Sheets

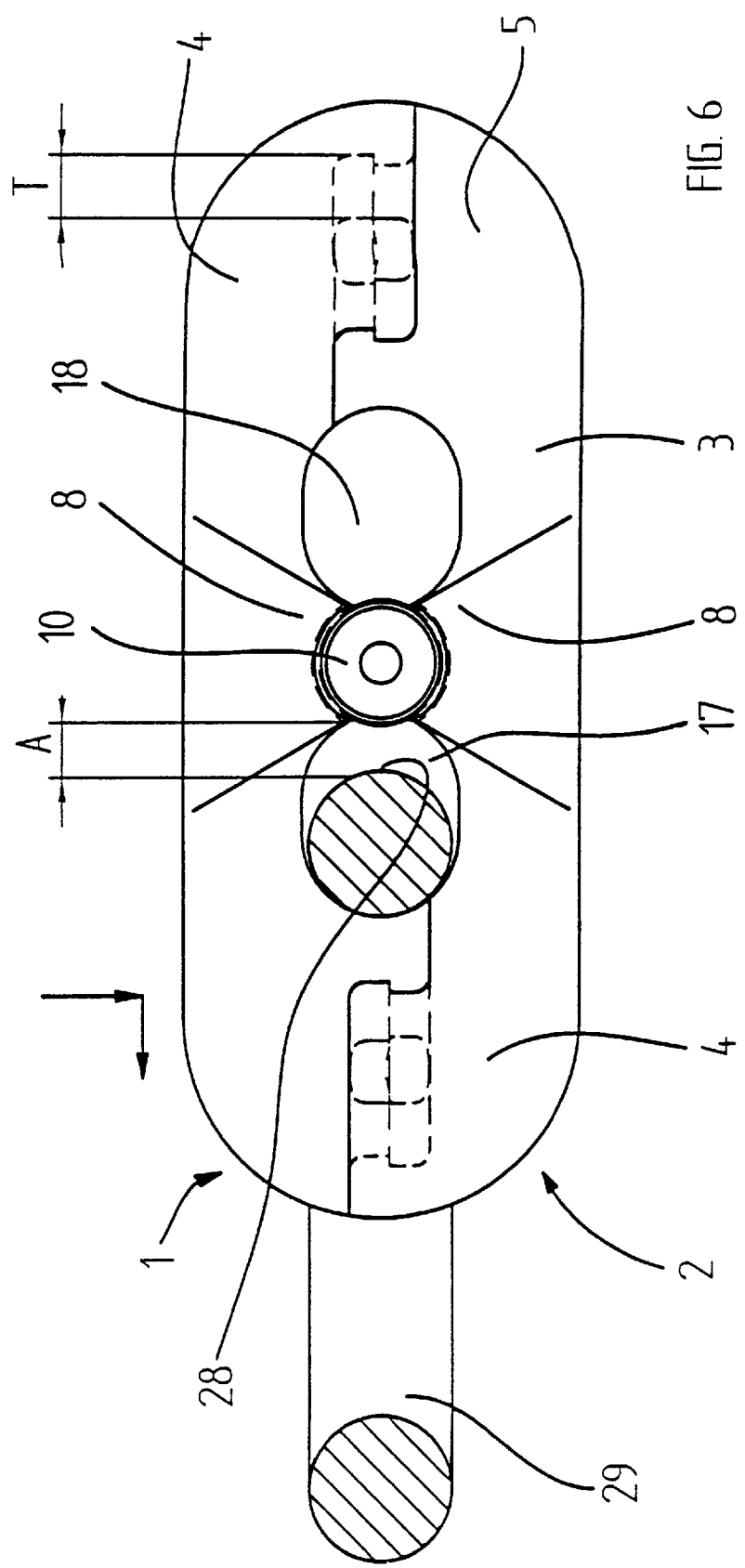

CONNECTING CHAIN LINK

BACKGROUND OF THE INVENTION

The invention relates to a connecting chain link for link chains having two connecting-link parts which can be displaced with respect to each other by limited amounts in the longitudinal direction of the connecting link, in order to open and close the connecting link, in which the connecting-link parts in each case have two ends which are connected to each other via a longitudinal web and essentially form a quarter circle, in which each connecting-link part has a stub provided with a retaining web at its one end and at its other end has a pocket which is used to hold the stub and the retaining web of the other connecting-link part in each case and is provided with a retaining groove for the retaining web, in which the longitudinal webs of the connecting-link parts have projections directed into the interior of the connecting link, and in which in the closed position the connecting-link parts are secured by at least one locking element against the connecting link being unintentionally opened.

DE 298 11 332 U1 discloses a connecting chain link of the abovementioned type, in which the projections which are directed into the interior of the connecting link each have a transverse web and a transverse groove, and in which, when the connecting link is closed, the transverse web of one connecting-link part in each case grips in the manner of a hook into the transverse groove of the other connecting-link part in each case in order thereby to relieve the load on the stub connections in the region of the rounded heads of the connecting chain link. That is to say, in the known design the hook-shaped projections are used to pursue the aim of absorbing in the centre of the connecting chain link some of the forces which act perpendicularly to the longitudinal axis of the connecting link on the connecting-link parts and attempt to separate the latter from one another. In the known connecting chain link, in order to secure the connecting-link parts against being unintentionally opened, use is made of comparatively thin pins which, after the connecting link is closed, are knocked into transverse holes in the region of the ends of the connecting-link parts. As experience has shown, after a prolonged period of operation, the removal again of the pins for the purpose of opening the connecting link causes considerable difficulties which can be attributed firstly to the formation of frictional corrosion and secondly to the deformation of the pins under load. In addition, the fact that the strength of the connecting chain link is somewhat impaired when the transverse holes are made in the region of the stub connections has proven unfavourable.

SUMMARY OF THE INVENTION

The invention is based on the object of providing a connecting chain link of the generic type under consideration, which can be removed easily, even after prolonged operating periods, and whose strength is not put at risk by transverse holes in the region of the stub connections between the connecting-link parts. According to the invention, this object is achieved by the mutually facing ends of the projections forming bearings for a central locking element.

The connecting chain link according to the invention provides the advantage that the locking element, because of its central position, is accessible without any problem when chain links are fitted into the connecting link, and that it can have considerably larger cross-sections than the pins of the known connecting link without impairing the strength of the connecting link in the region of its stub connections. Both facts mentioned above noticeably facilitate the fixing and removal of the locking element.

BRIEF DESCRIPTION OF THE DRAWINGS

Further details and features of the invention emerge from the subclaims and from the description below of an exemplary embodiment illustrated in the attached drawing, in which:

FIG. 6 shows a side view of the connecting link.

DESCRIPTION OF THE BEST MODES FOR CARRYING OUT THE INVENTION

Figure 1:
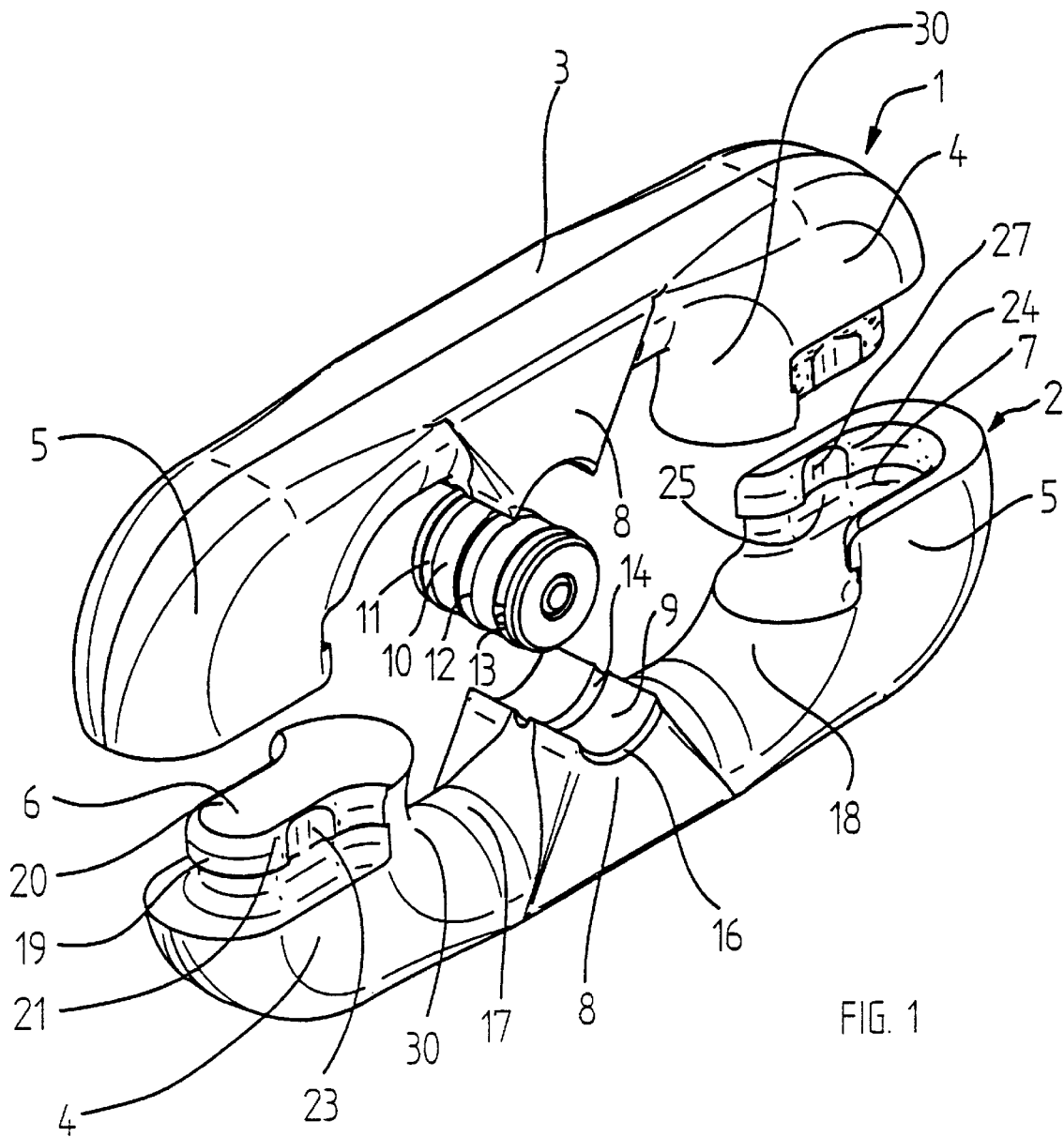
FIG. 1 shows the perspective illustration of the parts, separated from each other, of a first connecting chain link.
Figure 2:
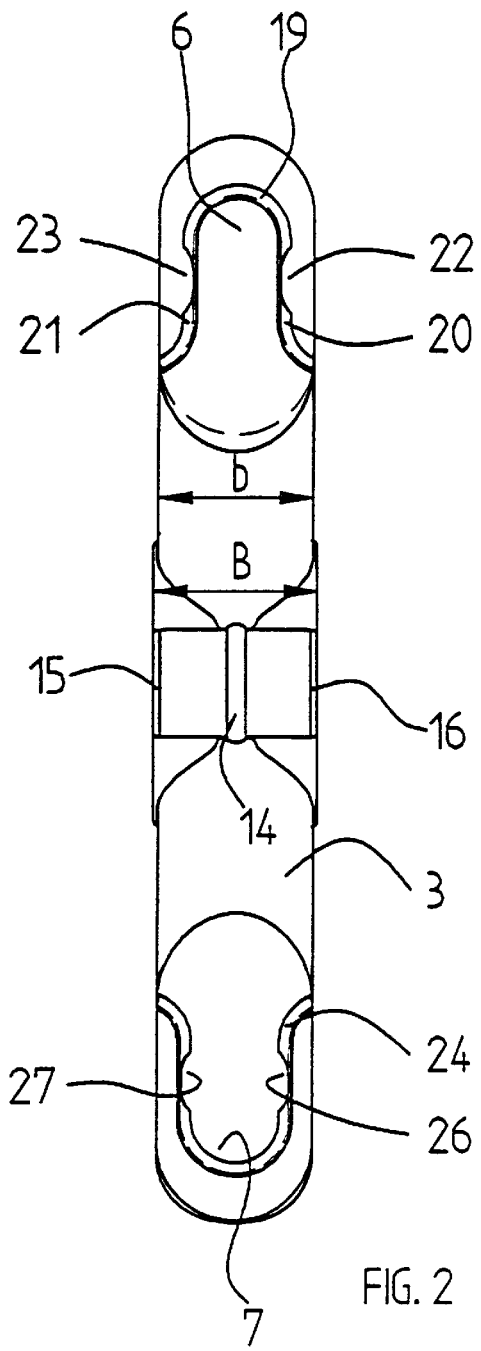
FIG. 2 shows the plan view of the inside of one of the two connecting-link parts according to FIG. 1.
Figure 3:
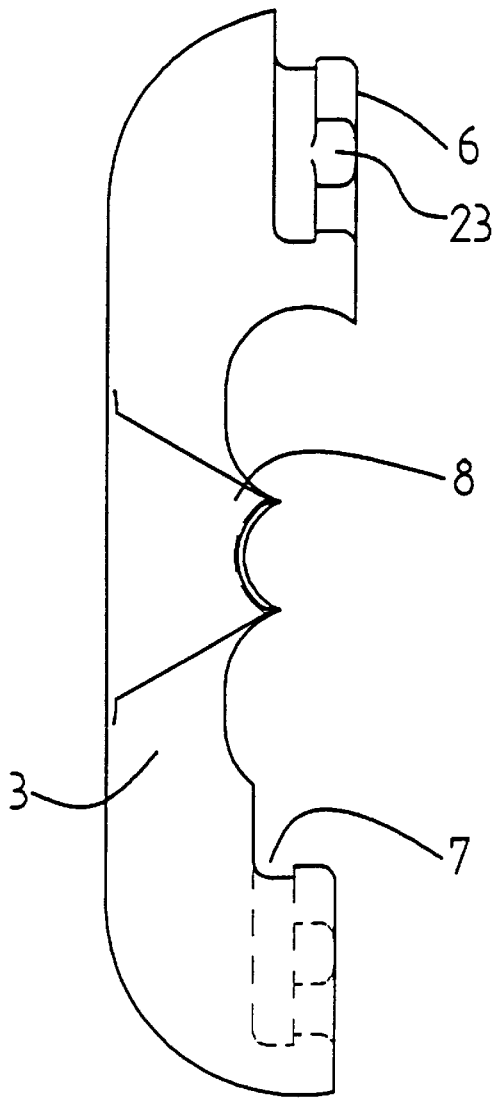
FIG. 3 shows the side view of the connecting-link part according to FIG. 2.
Figure 4:
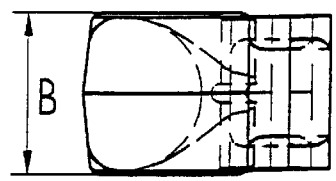
FIG. 4 shows the end view of the connecting-link part according to FIGS. 2 and 3.

In FIG. 1, 1 and 2 are general designations of two connecting-link parts which are of identical design and are arranged rotationally symmetrically with respect to each other. Each of the two connecting-link parts 1 and 2 has two ends 4 and 5 which are connected to each other by a longitudinal web 3 and are essentially designed in the form of a quarter circle. Each connecting-link part 1 or 2 is provided with a stub 6 at its one end 4, and at its other end 5 with a pocket 7 to hold the stub 6 of the upper connecting-link part in each case. In the centre of the longitudinal links 3 there are projections 8 which are directed towards the interior of the connecting chain link, increase the cross-section of the longitudinal links 3 at the abovementioned location and form bearings having shell-shaped supporting surfaces 9 for a central locking element 10. The distance between those side surfaces of the projections 8 which face the ends 4 and 5 decreases towards those ends of the projections which form the supporting surfaces 9, i.e. the projections 8 have a cross-section tapering towards the centre of the connecting link. In the closed position of the connecting link, the supporting surfaces 9 enclose the bolt-shaped locking element 10 over at least 220° of its circumference. The locking element 10 is provided with three snap rings 11, 12 and 13 which are guided in grooves around its circumference and the central one 12 of which, in the closed position of the connecting link, snaps into a slot 14 made in the supporting surface 9, while the two outer ones 11 and 13 are supported against the supporting surfaces 9 of the projections 8. The snap rings 11 to 13 prevent both axial and tilting movements of the locking element 10 in the assembled state of the connecting link. Sloping surfaces 15 and 16 facilitate the introduction of the locking element 10 into the holder formed by the supporting surfaces 9.

When connecting sections of chain strands with the aid of the connecting chain link illustrated, the end links of the sections of chain strands are first of all fitted into the hollows 17, 18 in the lower connecting-link part 2. After that, the upper connecting-link part 1 is pressed against the lower connecting-link part 2, in a position which is offset with respect to the lower connecting-link part 2 in the direction of the longitudinal axis of the connecting chain link, in order finally, by means of a relative movement between the connecting-link parts in the direction of the longitudinal axis of the connecting link, to be pushed into an end position which permits the locking element 10 to be put in its place. It stands to reason that, at a given pitch of the links of the sections of chain strands to be connected to one another, the distance by which the connecting-link parts 1, 2 can be displaced in the direction of the longitudinal axis of the connecting link is more restricted than is the case with connecting chain links of a similar type which do not have projections directed into the interior of the connecting link and which are disclosed, for example, in German Utility Model 74 35 053. This is the reason for the fact that in the case of the known connecting chain link of similar generic type, the stub of the connecting-link parts is merely provided with a very short and narrow projection which was only suitable for absorbing small transverse forces and ultimately provided the reason for the hook-shaped design of the projections of the relevant connecting chain link.

Figure 5:
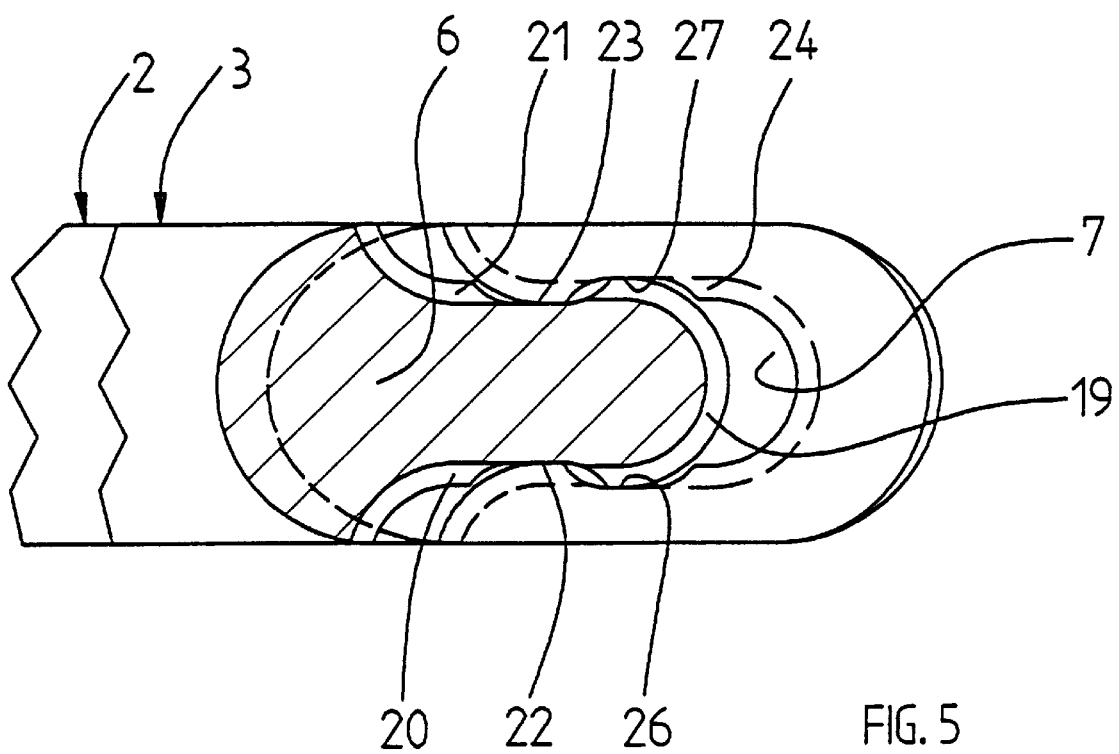
FIG. 5 shows, on an enlarged scale and partially in section, the right-hand ends of the connecting-link parts 1 and 2 in an intermediate position as the connecting link is closed.

In order to be able to absorb comparatively large transverse forces in the region of the curved ends of the connecting chain link in spite of the short displacement path available for the connecting-link parts in the direction of the longitudinal axis of the connecting chain link, the stubs 6 are provided with an essentially U-shaped retaining web 19 which, in the region of its limbs 20, 21 running parallel to each other, has clearances 22, 23 which divide the limbs 20, 21 into two sections in each case. At the same time, the wall 24, which faces the dividing gap of the connecting chain link and which belongs to a U-shaped retaining groove 25 of the pocket 7, is provided with recesses 26, 27. The size and position of the clearances 22, 23 and of the recesses 26, 27 are matched to one another in such a manner that the connecting-link parts 1, 2 can be joined together in an intermediate position, in which their stubs 6 and the pockets 7 already partially overlap, by means of the already mentioned movement directed perpendicularly to the longitudinal axis of the connecting link, in order subsequently to be able to be transferred into their end position by means of a displacement movement in the direction of the longitudinal axis. Consequently, not only is a projection arranged in the apex of the stub available in order to transmit transverse forces, but so too is the majority of the retaining web 19. For a better understanding of the facts, FIG. 5 shows, on an enlarged scale, the intermediate position in which the stub 6, illustrated cut-away, is pushed into the pocket 7 perpendicularly to the longitudinal axis of the connecting link in the plane running through the longitudinal webs 3 of the two connecting-link halves 1, 2.

The displacement path corresponding to the insertion depth T of the retaining webs 19 into the retaining groove 25 in the direction of the longitudinal axis of the connecting chain link has inevitably to be smaller than the distance A between the apex 28 of the rounded head of a chain link 29 fitted into the connecting link and the corner points of the holder for the locking element 10.

Since those ends 4 of the connecting-link parts 1, 2 which are provided with stubs 6 have saddle surfaces 30 for the chain links which are to be fitted and belong to the sections of chain strands to be connected to one another in each case, in cases in which very large longitudinal forces are to be transmitted, there may be a slight relative movement between the projections 8 of the particular connecting-link parts 1, 2, which relative movement enables expansion forces take effect in the region of the ends 4, 5 of the connecting-link parts 1, 2. However, the simultaneous relative displacement of the projections 8 with respect to each other produces counterforces which at least partially compensate for the effect of the abovementioned expansion forces.

What is claimed is:

1. Connecting chain link for link chains having two connecting-link parts which are movable relative to each other, within predetermined limits, in a longitudinal direction of said connecting chain link for opening and closing said connecting chain link; said connecting-link parts each having two ends connected to each other by a longitudinally oriented web, one end of each of said connecting-link parts comprising a stub provided with a retaining web, the other end of each of said connecting-link parts defining a pocket with a retaining groove for receiving said stub and said retaining web of said other connecting-link part, each said longitudinal web of each said connecting-link part having a projection extending in a direction into an interior portion of said connecting chain link, said connecting-link parts being secured in a closed position by at least one locking element, characterized in that said projections (8) extending respectively from said longitudinal webs of said respective connecting-link parts have mutually facing ends which form bearings for said at least one locking element (10).

2. Connecting chain link according to claim 1, characterized in that said locking element (10) defines a circumference, and said bearings formed by said projections (8) enclose the locking element (10) over at least a part of said circumference.

3. Connecting chain link according to claim 2, characterized in that the bearings have partially cylindrical supporting surfaces (9) for receiving a cylindrical-shaped locking element (10).

4. Connecting chain link according to claim 3, characterized in that the locking element (10) defines a circumference, and that the supporting surfaces (9) enclose the locking element (10) over at least 220° of said circumference.

5. Connecting chain link according to claim 4, characterized in that the locking element (10) defines a circumference, and that the supporting surfaces (9) enclose the locking element (10) over at least 220° of said circumference.

6. Connecting chain link according to claim 1, characterized in that the bearings have partially cylindrical supporting surfaces (9) for recieving a cylindrical-shaped locking element (10).

7. Connecting chain link according to claim 6, characterized in that the locking element (10) defines a circumference, and that the supporting surfaces (9) enclose the locking element (10) over at least220° of said circumference.

8. Connecting chain link according to claim 7, characterized in that the locking element (10) has a central groove, and a first snap ring (12) received in said central groove; and each of said supporting surfaces (9) defines a snap-in slot (14) for receiving said snap ring (12) therein for securing the position of the locking element (10) in an axial orientation relative to said bearings.

9. Connecting chain link according to claim 7, characterized in that said two connecting-link parts (1, 2) are of identical design.

10. Connecting chain link according to claim 6, characterized in that the locking element (10) has a central groove, and a first snap ring (12) recieved in said central groove; and each of said supporting surfaces (9) defines a snap-in slot (14) for recieving said snap ring (12) therein for securing the position of the locking element (10) in an axial orientation relative to said bearings.

11. Connecting chain link according to claim 10, characterized in that the locking element (10) defines a first end and a second end, each of said first and second ends defining a groove proximate thereto; and second and third snap rings (11, 13) received, respectively, in said grooves proximate to said first and second ends of said locking element (10).

12. Connecting chain link according to claim 10, characterized in that said two connecting-link parts (1, 2) are of identical design.

13. Connecting chain link according to claim 11, characterized in that said two connecting-link parts (1, 2) are of identical design.

14. Connecting chain link according to claim 6, characterized in that said two connecting-link parts (1, 2) are of identical design.

15. Connecting chain link according to claim 6, characterized in that said projections (8) extending from said two connecting-link parts have side surfaces, each of said side surfaces facing one of said ends (4, 5) of said respective connecting-link parts (1, 2), said side surfaces being formed such that the distance between said side surfaces decreases in a direction towards said ends of said projections (8) forming said supporting surfaces (9).

16. Connecting chain link according to claim 6, characterized in that the longitudinal webs (3) of the connecting-link parts (1, 2) are of maximum width at the projections (8).

17. Connecting chain link according to claim 1, characterized in that said retaining web (19) formed from said stub (6) at one of said ends of each of said connecting-link parts (1, 2) is essentially U-shaped, said retaining web (19) comprising two sections which are separated from each other by a clearance (22, 23); said retaining groove (25) defined at the other of said ends of each of said connecting-link Parts (1, 2) defines a wall (24), said wall defining a recess (26, 27); wherein the size and position of said recess (26, 27) and of said clearance (22, 23) are selected such that said connecting-link parts (1, 2) can be joined together and separated from each other in an intermediate position by means of relative movement in a direction perpendicular to a longitudinal axis of said connecting link, said connecting-link parts (1, 2) being arranged to only partially overlap each other in said intermediate position.

18. Connecting chain link according to claim 17, characterized in that an insertion depth (T) is defined between said retaining web (19) and said retaining groove (25), said insertion depth (T) being smaller than the distance (A) between the locking element (10) and an apex (28) of a rounded head of a chain link (29) fitted into the connecting link.

19. Connecting chain link according to claim 1, characterized in that said two connecting-link parts (1, 2) are of identical design.

20. Connecting chain link according to claim 2, characterized in that said two connecting-link parts (1, 2) are of identical design.

* * * * *

UNITED STATES PATENT AND TRADEMARK OFFICE
CERTIFICATE OF CORRECTION

PATENT NO. : 6,220,011 B1
DATED : April 24, 2001
INVENTOR(S) : Hans Dalferth et al.

It is certified that error appears in the above-identified patent and that said Letters Patent is hereby corrected as shown below:

<u>Column 4,</u>
Claim 7, line 51, delete "lease220°", and subtitute -- lease 220° --.
Claim 10, line 65, delete "recieved", and substitute -- received --.
Claim 10, line 67, delete "recieved", and substitute -- received --.

<u>Column 6,</u>
Claim 17, line 6, delete "Parts", and substitute -- parts --.

Signed and Sealed this

Twenty-seventh Day of November, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,220,011 B1
DATED : April 24, 2001
INVENTOR(S) : Hans Dalferth et al.

It is certified that error appears in the above-identified patent and that said Letters Patent is hereby corrected as shown below:

Column 4, claim 7,
Line 51, delete "least220 " and substitute -- least 220 --.

Column 4, claim 10,
Line 65, delete "recieved", and substitute -- received --.
Line 67, delete "recieved", and substitute -- received --.

Column 6, claim 17,
Line 6, delete "Parts", and substitute -- parts --.

This certificate supersedes Certificate of Correction issued November 27, 2001.

Signed and Sealed this

Nineteenth Day of March, 2002

Attest:

JAMES E. ROGAN
Director of the United States Patent and Trademark Office

Attesting Officer